(12) United States Patent
Yokoyama

(10) Patent No.: US 12,279,049 B2
(45) Date of Patent: Apr. 15, 2025

(54) INFORMATION PROCESSING APPARATUS DISPLAYING CAPTURED IMAGE FOR REMOTE SUPPORT OF AN OPERATION BY AN OPERATOR

(71) Applicant: CANON KABUSHIKI KAISHA, Tokyo (JP)

(72) Inventor: Masanao Yokoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 18/296,262

(22) Filed: Apr. 5, 2023

(65) Prior Publication Data
US 2023/0328394 A1 Oct. 12, 2023

(30) Foreign Application Priority Data
Apr. 8, 2022 (JP) ................................. 2022-064560

(51) Int. Cl.
*H04N 23/80* (2023.01)
*G02B 27/01* (2006.01)
*G03B 17/48* (2021.01)
*G06F 1/16* (2006.01)
*G06T 7/11* (2017.01)

(52) U.S. Cl.
CPC ........... *H04N 23/80* (2023.01); *G02B 27/017* (2013.01); *G03B 17/48* (2013.01); *G06F 1/1605* (2013.01); *G06T 7/11* (2017.01); *G06T 2207/20104* (2013.01)

(58) Field of Classification Search
CPC ...... H04N 23/80; G02B 27/017; G03B 17/48; G06F 1/1605; G06F 1/163; G06F 1/1686; G06F 3/0304; G06F 3/04842; G06F 3/04845; G06T 7/11; G06T 2207/20104; G06V 2201/06; G06V 10/25
USPC ...................................................... 348/222.1
See application file for complete search history.

(56) References Cited

U.S. PATENT DOCUMENTS

| 8,041,076 | B1 * | 10/2011 | Bourdev | .............. | H04N 23/611 |
| | | | | | 382/118 |
| 9,860,448 | B2 * | 1/2018 | Yoo | ........................ | H04N 23/69 |
| 9,992,421 | B2 * | 6/2018 | Tsubusaki | .............. | G06V 10/25 |
| 2004/0223649 | A1 * | 11/2004 | Zacks | .................. | H04N 5/2621 |
| | | | | | 382/218 |

(Continued)

FOREIGN PATENT DOCUMENTS

| JP | 2007148548 A | 6/2007 |
| JP | 2018156239 A | 10/2018 |
| JP | 2021013138 A | 2/2021 |

*Primary Examiner* — Usman A Khan
(74) *Attorney, Agent, or Firm* — Canon U.S.A., Inc. IP Division

(57) ABSTRACT

An information processing apparatus that displays a captured image captured by an imaging apparatus on a display unit, the information processing apparatus includes a display controller configured to perform display control to display an image of a region of interest included in the captured image, on the display unit, wherein, the display controller displays, in a case where the region of interest is in an angle of view of a frame of the captured image, the image of the region of interest included in the frame, and displays, in a case where the region of interest is off from the angle of view of the frame of the captured image, the image of the region of interest included in a preceding frame preceding the frame.

15 Claims, 12 Drawing Sheets

(56) References Cited

U.S. PATENT DOCUMENTS

| | | | | |
|---|---|---|---|---|
| 2005/0129324 A1* | 6/2005 | Lemke | ............... | G06V 10/26 |
| | | | | 382/284 |
| 2006/0061598 A1* | 3/2006 | Mino | ................. | G06T 11/00 |
| | | | | 345/629 |
| 2008/0239092 A1* | 10/2008 | Sugino | ............. | H04N 23/611 |
| | | | | 348/222.1 |
| 2010/0066840 A1* | 3/2010 | Asukai | ............... | H04N 5/262 |
| | | | | 348/222.1 |
| 2010/0079491 A1* | 4/2010 | Nonaka | .............. | G06T 11/00 |
| | | | | 345/630 |
| 2014/0176764 A1* | 6/2014 | Nakamura | ......... | G06V 40/169 |
| | | | | 348/231.99 |
| 2014/0267803 A1* | 9/2014 | Shintani | ............. | H04N 23/61 |
| | | | | 348/222.1 |
| 2015/0146011 A1* | 5/2015 | Tsubusaki | ........... | G06V 40/161 |
| | | | | 348/169 |
| 2017/0104938 A1* | 4/2017 | Shimosato | ........... | H04N 23/61 |
| 2024/0054750 A1* | 2/2024 | Ito | ...................... | G06V 10/62 |

\* cited by examiner

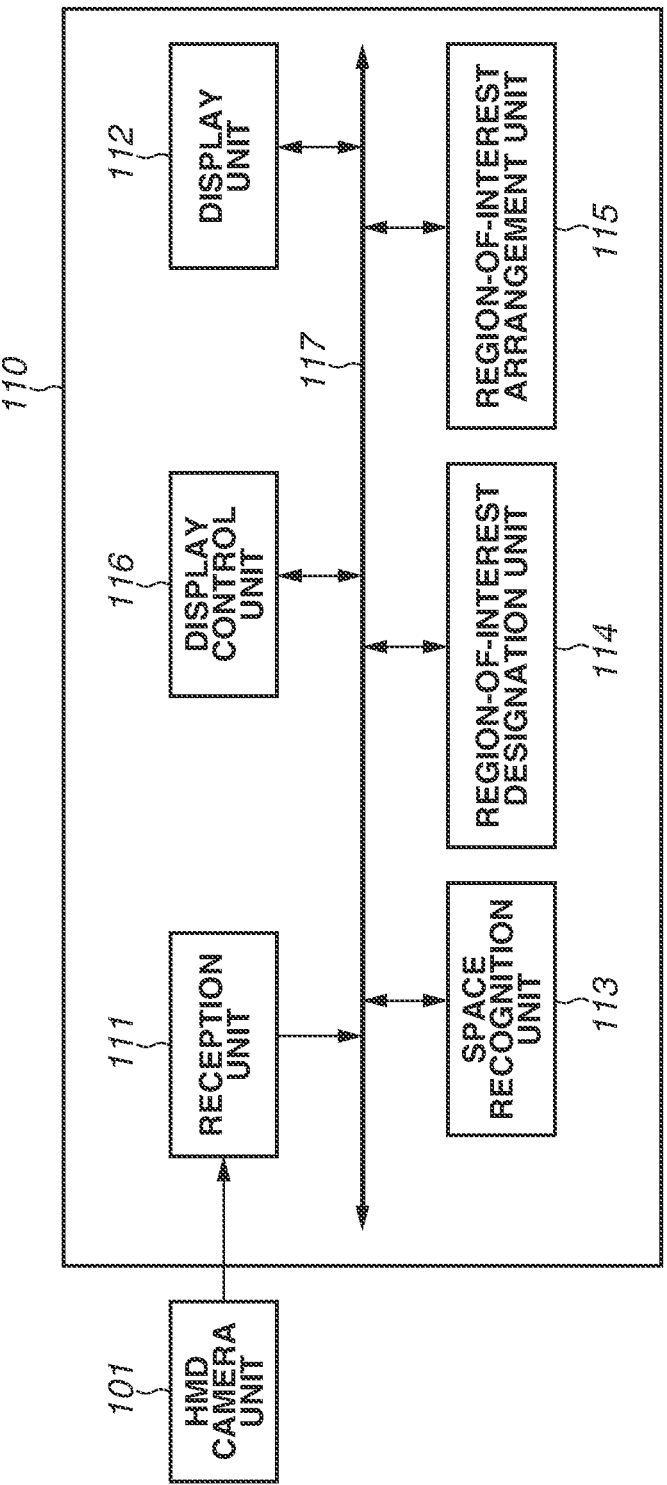

FIG.2A
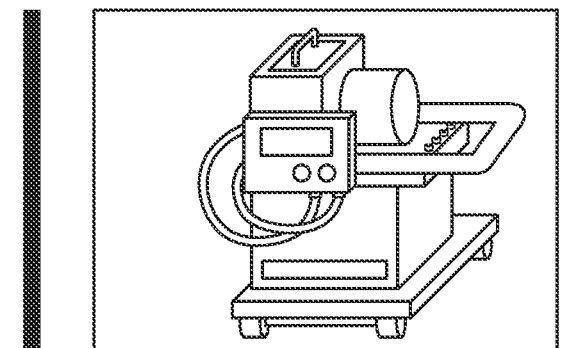
(A-1)
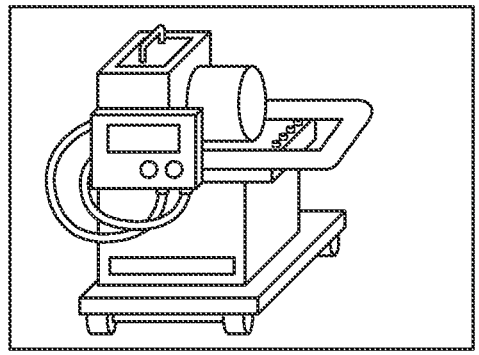
(A-2)
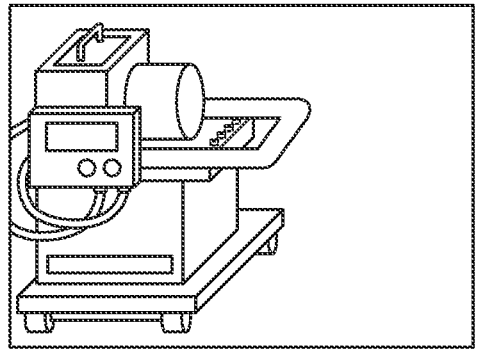
(A-3)
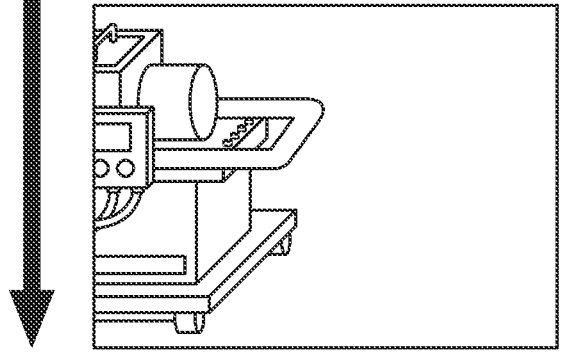
(A-4)

FIG.2B
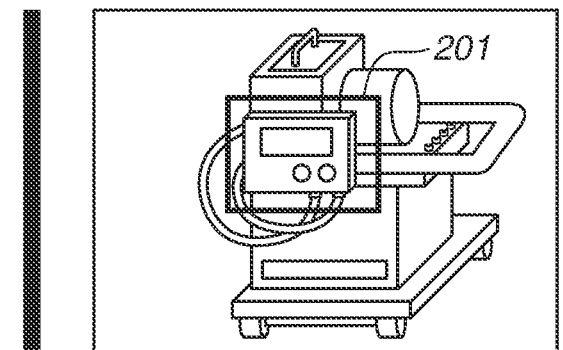
(B-1)
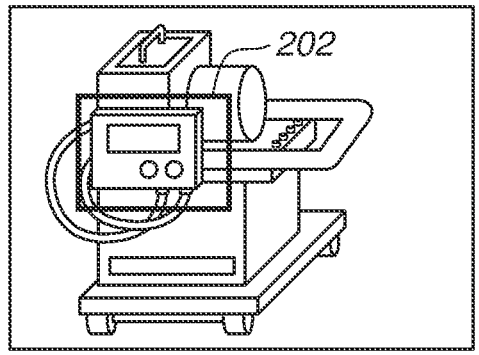
(B-2)
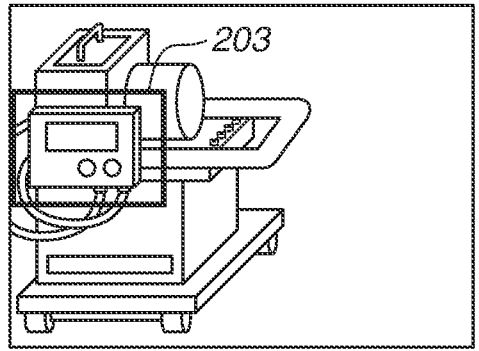
(B-3)
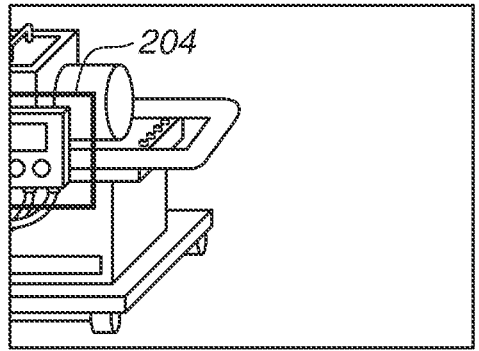
(B-4)

(A-1)

(A-2)

(C-1)

(C-2)

INFORMATION PROCESSING APPARATUS DISPLAYING CAPTURED IMAGE FOR REMOTE SUPPORT OF AN OPERATION BY AN OPERATOR

BACKGROUND OF THE DISCLOSURE

Field of the Disclosure

The present disclosure relates to an information processing apparatus suitable for, for example, remote support of an operation performed by an operator, an information processing method, and a storage medium.

Description of the Related Art

A remote support system that is used to remotely support an operation performed by an operator has been provided.

In the remote support system, when the operator captures an image of an operation object by a camera, a captured image is transferred to a personal computer or the like of an assistant at a remote place via a network in real time. The assistant checks the transferred captured image on a monitor to grasp an operation state, and provides support to the operator. Examples of the camera that is used to capture an image of the operation object include a digital camera mounted on a head mount display (hereinafter, abbreviated as HMD). Using the digital camera mounted on the HMD is suitable because image capturing is performed at a position close to a line of sight of the operator, and is excellent for increasing workability because both hands of the operator are not used for image capturing. The digital camera mounted on the HMD is thus widely utilized in various scenes.

Japanese Patent Application Laid-Open No. 2018-156239 discusses an operation support apparatus having improved visibility during operation on a designated region of an operation object, and extracts an image of the designated region from a camera image and displays the extracted image as a designated region image on a display apparatus.

In the remote support system, when the operation object is off from the angle of view of an image captured by the camera, the operation object cannot be checked on the monitor viewed by the assistant, and it is difficult for the assistant to support the operator. For example, in a case of using the digital camera mounted on the HMD, the captured image may be blurred due to a motion of a head of the operator, and the operation object may disappear from or appear in the angle of view of the captured image repeatedly. The technique discussed Japanese Patent Application Laid-Open No. 2018-156239 may be insufficient for dealing with a case in which the operation object is off from the angle of view of the camera image (captured image).

SUMMARY OF THE DISCLOSURE

The present disclosure is directed to a technique enabling a region of interest to be checked even when the region of interest is off from an angle of view of a captured image.

According to an aspect of the present disclosure, an information processing apparatus that displays a captured image captured by an imaging apparatus on a display unit, the information processing apparatus includes a display controller configured to perform display control to display an image of a region of interest included in the captured image, on the display unit, wherein, the display controller displays, in a case where the region of interest is in an angle of view of a frame of the captured image, the image of the region of interest included in the frame, and displays, in a case where the region of interest is off from the angle of view of the frame of the captured image, the image of the region of interest included in a preceding frame preceding the frame.

Further features of the present disclosure will become apparent from the following description of exemplary embodiments with reference to the attached drawings.

BRIEF DESCRIPTION OF THE DRAWINGS

FIG. 1 is a diagram illustrating a configuration example of a network system according to a first exemplary embodiment.

FIG. 2A is a diagram illustrating time-series changes of a camera image according to the first exemplary embodiment. FIG. 2B is a diagram illustrating time-series changes of a region of interest according to the first exemplary embodiment.

DESCRIPTION OF THE EMBODIMENTS

Figure 2C:
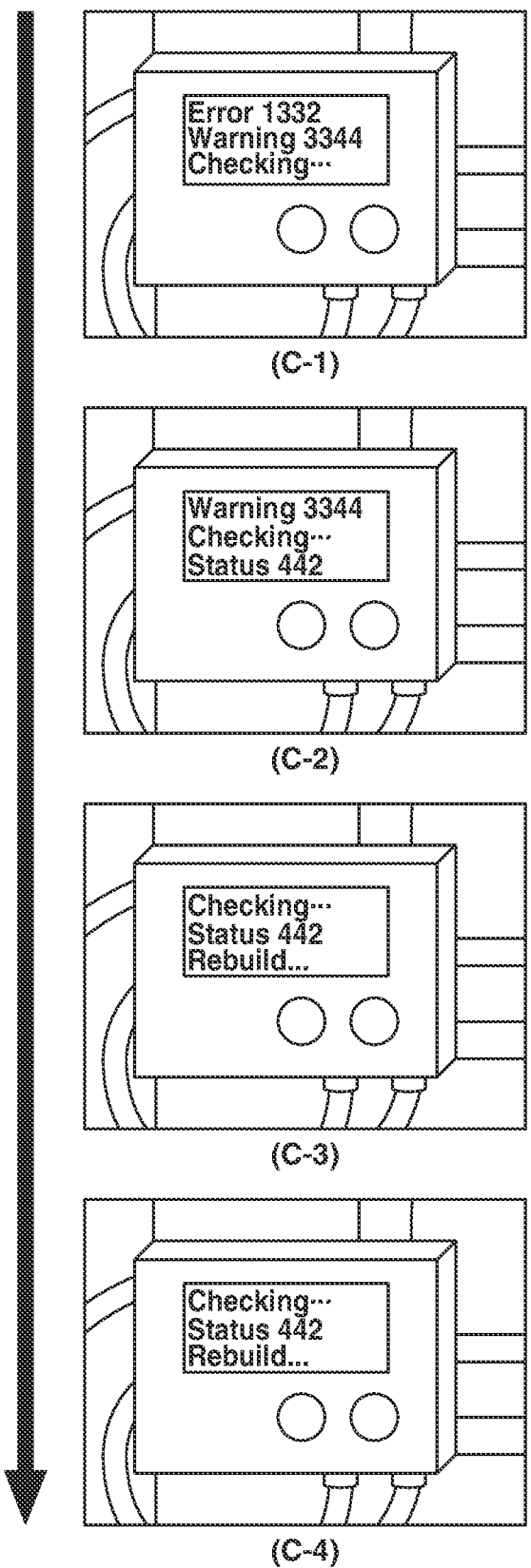
FIG. 2C is a diagram illustrating time-series changes of a display unit of a remote support apparatus according to the first exemplary embodiment.

Some preferred exemplary embodiments of the present disclosure are described below with reference to accompanying drawings.

FIG. 1 is a diagram illustrating a configuration example of a network system according to a first exemplary embodiment. The network system functions as a remote support system to remotely support an operation that is performed by an operator.

A head mount display (HMD) camera unit 101 is a digital camera mounted on an HMD attached to a head of the operator, and transmits data on an image of an operation state to a remote support apparatus 110 via a network of wireless connection or wired connection. While, in the present exemplary embodiment, the HMD camera unit 101 is used as an example, an imaging apparatus according to the present disclosure can be a digital camera connectable to a network, a digital camera mounted on a smartphone or a tablet, or the like.

The remote support apparatus 110 communicates with the HMD camera unit 101, and displays a captured image (hereinafter, referred to as camera image) captured by the HMD camera unit 101, on a display unit 112. The camera image is a moving image. The remote support apparatus 110 includes a reception unit 111, the display unit 112, a space recognition unit 113, a region-of-interest designation unit 114, a region-of-interest arrangement unit 115, and a display control unit 116. The units 111 to 116 are connected with each other via a bus 117. The remote support apparatus 110 includes a computer apparatus (not illustrated) including a central processing unit (CPU), a memory, and a storage. The CPU realizes functions of the units 111 to 116 by executing predetermined programs.

The reception unit 111 receives the data on the camera image from the HMD camera unit 101 via the network.

The display unit 112 is a monitor including a liquid crystal display (LCD), and displays the camera image received by the reception unit 111 and an image of a region of interest described below, under the control of the display control unit 116.

The space recognition unit 113 recognizes a space from the camera image received by the reception unit 111, and calculates a three-dimensional environmental map coordinate. Examples of a method of calculating the environmental map coordinate include a method using visual simultaneous localization and mapping (SLAM).

The visual SLAM is a technique that can simultaneously perform self-position estimation of a camera and creation of an environmental map coordinate under an unknown environment.

The region-of-interest designation unit 114 designates a region of interest based on the camera image. The region-of-interest designation unit 114 receives designation of the region of interest on the camera image displayed on the display unit 112, and stores a coordinate of the region of interest on the three-dimensional environmental map coordinate calculated by the space recognition unit 113, as region-of-interest information. The region of interest can be designated by a well-known technique. For example, as discussed in Japanese Patent Application Laid-Open No. 2007-148548, a three-dimensional region designation method of designating a three-dimensional region on a two-dimensional display screen by using a common pointing device, such as a mouse, may be used.

The region-of-interest arrangement unit 115 maps the region of interest on the three-dimensional environmental map coordinate calculated by the space recognition unit 113 based on the region of interest designated by the region-of-interest designation unit 114.

The display control unit 116 performs control to display the camera image received by the reception unit 111, on the display unit 112. Further, the display control unit 116 controls extraction of the region of interest from the camera image received by the reception unit 111, based on the region of interest mapped by the region-of-interest arrangement unit 115, enlargement of an image of the region of interest, and display of the enlarged image on the display unit 112.

In a case were the region of interest is present in an angle of view of a frame of the camera image, the display control unit 116 extracts the region of interest from the frame, enlarges the image of the region of interest, and displays the enlarged image on the display unit 112. The display control unit 116 has a function of storing the image of the region of interest for one frame, and updates the stored image of the region of interest with the latest image every time the region of interest is extracted from the frame of the camera image. Further, in a case where the region of interest is off from the angle of view of the frame of the camera image, the display control unit 116 enlarges the stored image of the region of interest, which is the image of the region of interest in a frame preceding the current frame, and displays the enlarged image on the display unit 112.

A display example of the display unit 112 is described with reference to FIGS. 2A to 2C.

FIG. 2A illustrates time-series changes of the camera image, and frames (A-1), (A-2), (A-3), and (A-4) of the camera image are arranged in a time-series order. In this example, the HMD camera unit 101 performs image capturing while being panned rightward, and an object in the camera image moves leftward.

FIG. 2B includes diagrams schematically illustrating frames (B-1), (B-2), (B-3), and (B-4) in which regions of interest 201 to 204 are mapped in the frames (A-1), (A-2), (A-3), and (A-4) in FIG. 2A, respectively, by the region-of-interest arrangement unit 115.

FIG. 2C includes diagrams illustrating frames (C-1), (C-2), and (C-3) in which the regions of interest are extracted from the frames (A-1), (A-2), and (A-3) in FIG. 2A, respectively, and images of the regions of interest are enlarged and displayed. A frame (C-4) in FIG. 2C is a frame of the image same as the image of the region of interest in the frame (C-3).

More specifically, the region of interest 201 in the frame (B-1) in FIG. 2B is a region designated in the frame (A-1) in FIG. 2A by the region-of-interest designation unit 114. The region of interest 201 is a region mapped on the three-dimensional environmental map coordinate by the region-of-interest arrangement unit 115, based on the region-of-interest information stored by the region-of-interest designation unit 114. Because the region of interest 201 is in the angle of view of the frame of the camera image, the image of the region of interest 201 is enlarged and displayed on the display unit 112 as illustrated in the frame (C-1) in FIG. 2C.

The region of interest 202 in the frame (B-2) in FIG. 2B is a region mapped on the three-dimensional environmental map coordinate by the region-of-interest arrangement unit 115, based on the region-of-interest information on the region of interest designated in the frame (B-1) in FIG. 2B. The three-dimensional environmental map coordinate is calculated from the frame (A-2) in FIG. 2A by the space recognition unit 113. Because the region of interest 202 is in the angle of view of the frame of the camera image, the image of the region of interest 202 is enlarged and displayed on the display unit 112, as illustrated in the frame (C-2) in FIG. 2C.

The region of interest 203 in the frame (B-3) in FIG. 2B is a region mapped on the three-dimensional environmental map coordinate by the region-of-interest arrangement unit 115, based on the region-of-interest information on the region of interest designated in the frame (B-1) in FIG. 2B. The three-dimensional environmental map coordinate is calculated from the frame (A-3) in FIG. 2A by the space recognition unit 113. Because the region of interest 203 is in the angle of view of the frame of the camera image, the image of the region of interest 203 is enlarged and displayed on the display unit 112, as illustrated in the frame (C-3) in FIG. 2C.

As illustrated in the frames (C-1), (C-2), and (C-3) in FIG. 2C, in a case where the region of interest is in the angle of view of the frame of the camera image, the regions of interest are sequentially extracted from the respective frames, and are displayed, whereby the image of the region of interest is displayed as a live-view image.

The region of interest 204 in the frame (B-4) in FIG. 2B is a region mapped on the three-dimensional environmental map coordinate by the region-of-interest arrangement unit 115, based on the region-of-interest information on the region of interest designated in the frame (B-1) in FIG. 2B. The three-dimensional environmental map coordinate is calculated from the frame (A-4) in FIG. 2A by the space recognition unit 113. Because the region of interest 204 is at the edge of the angle of view of the frame of the camera image, the image of the region of interest 203 in one preceding frame (see frame (C-3) in FIG. 2C) is enlarged and displayed as a still image on the display unit 112 as illustrated in the frame (C-4) in FIG. 2C. Until the region of interest appears in the angle of view of the frame of the camera image again, the image of the region of interest 203 is continuously displayed on the display unit 112.

As described above, in a case where the region of interest is in the angle of view of the frame of the camera image, the image of the region of interest extracted from the frame is displayed, and an assistant can check the image of the region of interest as the live-view image. In a case where the region of interest is off from the angle of view of the frame of the camera image, the image of the region of interest extracted from the frame preceding the current frame is displayed. This enables the assistant to continuously check the image of the region of interest as a still image.

Figure 3:
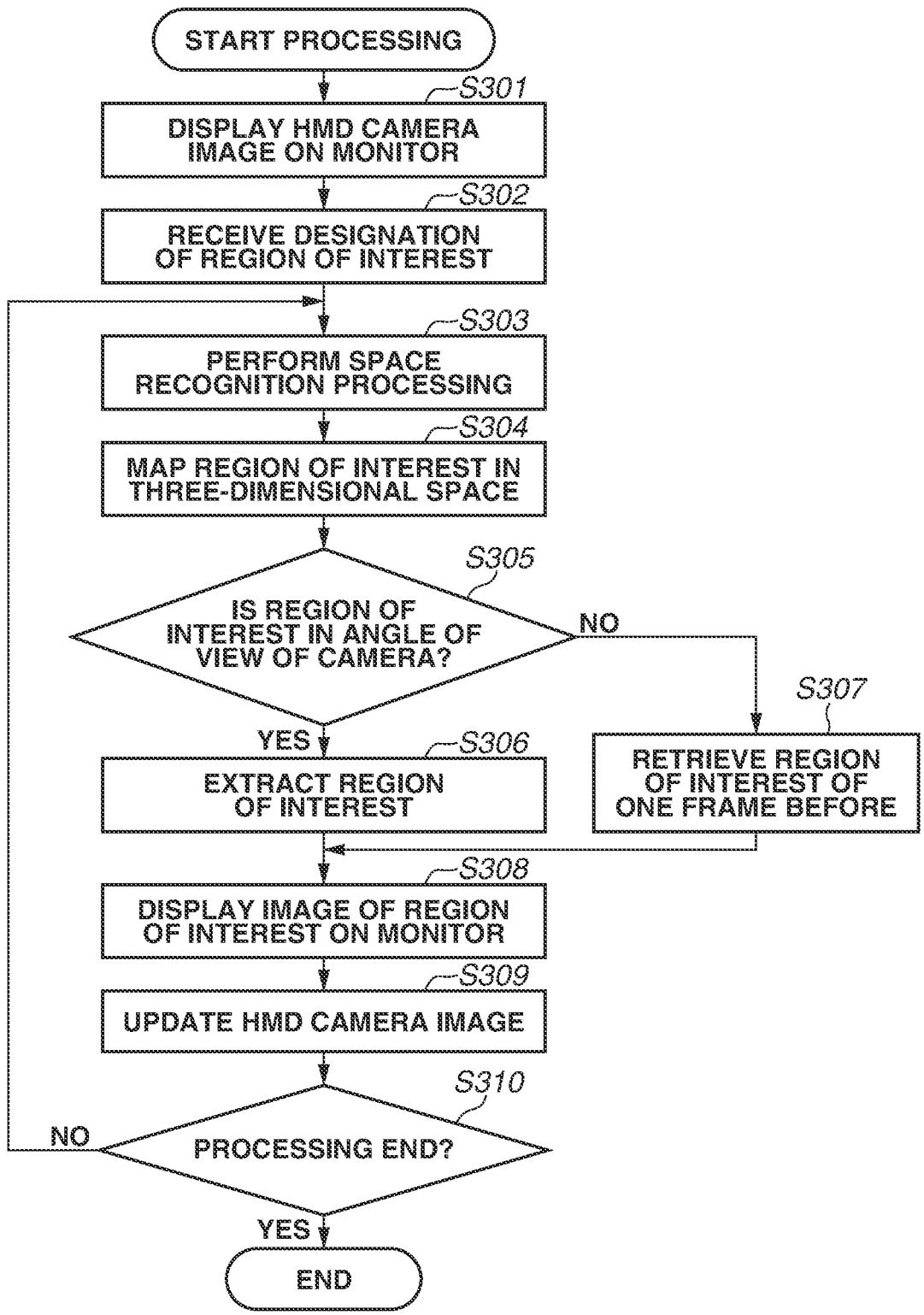
FIG. 3 is a flowchart illustrating processing performed by the remote support apparatus according to the first exemplary embodiment.

Next, processing performed by the remote support apparatus 110 according to the first exemplary embodiment is described with reference to FIG. 3. FIG. 3 is a flowchart illustrating the processing that is performed by the remote support apparatus 110 according to the first exemplary embodiment.

In step S301, the display control unit 116 displays the camera image received by the reception unit 111 on the display unit 112.

In step S302, the region-of-interest designation unit 114 receives designation of the region of interest on the camera image displayed on the display unit 112 in step S301, and stores a coordinate of the region of interest as the region-of-interest information.

In step S303, the space recognition unit 113 calculates the three-dimensional environmental map coordinate from the current frame of the camera image.

In step S304, the region-of-interest arrangement unit 115 maps the region of interest on the three-dimensional environmental map coordinate calculated in step S303, based on the region-of-interest information stored in step S302.

In step S305, the display control unit 116 determines whether the region of interest mapped on the three-dimensional environmental map coordinate in step S304 is in the angle of view of the current frame of the camera image. In a case where the region of interest is in the angle of view (YES in step S305), the processing proceeds to step S306. In a case where the region of interest is not in the angle of view (NO in step S305), the processing proceeds to step S307. A criterion of the determination of whether the region of interest is in the angle of view of the current frame can be previously determined. For example, in a case of the region of interest being even slightly off from the angle of view of the current frame, it can be determined that the region of interest is off from the angle of view. Alternatively, in a case of the region of interest being off from the angle of view of the current frame by a predetermined percentage of the region of interest (e.g., half of region of interest), it can be determined that the region of interest is off from the angle of view.

In step S306, the display control unit 116 extracts the region of interest mapped in step S304 from the current frame of the camera image, and generates an image of the region of interest. Further, the display control unit 116 stores the image of the region of interest for the one frame.

In step S307, the display control unit 116 retrieves the stored image of the region of interest.

In step S308, the display unit 112 enlarges the image of the region of interest generated in step S306 or the image of the region of interest retrieved in step S307, and displays the enlarged image on the display unit 112.

In step S309, the display control unit 116 updates the frame of the camera image to the next frame.

In step S310, the remote support apparatus 110 determines presence of an end instruction from the supporter. In a case where the end instruction has not been issued (NO in step S310), the processing returns to step S303. In a case where the end instruction has been issued (YES in step S310), the processing procedure of the flowchart ends.

As described above, in the first exemplary embodiment, even in a case where the region of interest is off from the angle of view of the frame of the camera image, the image of the region of interest included in the frame preceding the current frame is displayed. Therefore, the assistant can check the region of interest, and provide continuous support to the operator.

The components included in the remote support apparatus 110 can be provided in the HMD camera unit 101 (or the HMD on which the HMD camera unit 101 is mounted). For example, the space recognition unit 113 and the region-of-interest arrangement unit 115 can be provided in the HMD camera unit 101 (or the HMD on which the HMD camera unit 101 is mounted).

While, in the present exemplary embodiment, the display control unit 116 of the remote support apparatus 110 extracts the region of interest from the frame of the camera image, and generates the image of the region of interest, the processing can be performed by the HMD camera unit 101 (or the HMD on which the HMD camera unit 101 is mounted).

In the flowchart of FIG. 3, for example, the processing in steps S303 to S307 can be performed by the HMD camera unit 101 (or the HMD on which the HMD camera unit 101 is mounted). In this case, the region-of-interest information based on designation in step S302 is transmitted from the remote support apparatus 110 to the HMD.

While, in the present exemplary embodiment, the remote support apparatus 110 functions as the information processing apparatus according to the present disclosure is described, the imaging apparatus according to the present disclosure can function as the information processing apparatus according to the present disclosure, and control display on a monitor of the assistant.

In a second exemplary embodiment, a description will be given of a case including a function of performing geometric transformation on the image of the region of interest is described. The configuration of the remote support apparatus 110 is similar to the configuration of the remote support apparatus 110 according to the first exemplary embodiment. In the following description, the components are denoted by the same reference numerals, the redundant descriptions are omitted, and differences from the first exemplary embodiment are mainly described. In the present exemplary embodiment, the display control unit 116 additionally has a function of performing geometric transformation of an image, and functions as an image processing unit according to the present disclosure. As the geometric transformation of the image, for example, affine transformation is used.

Figure 4A:
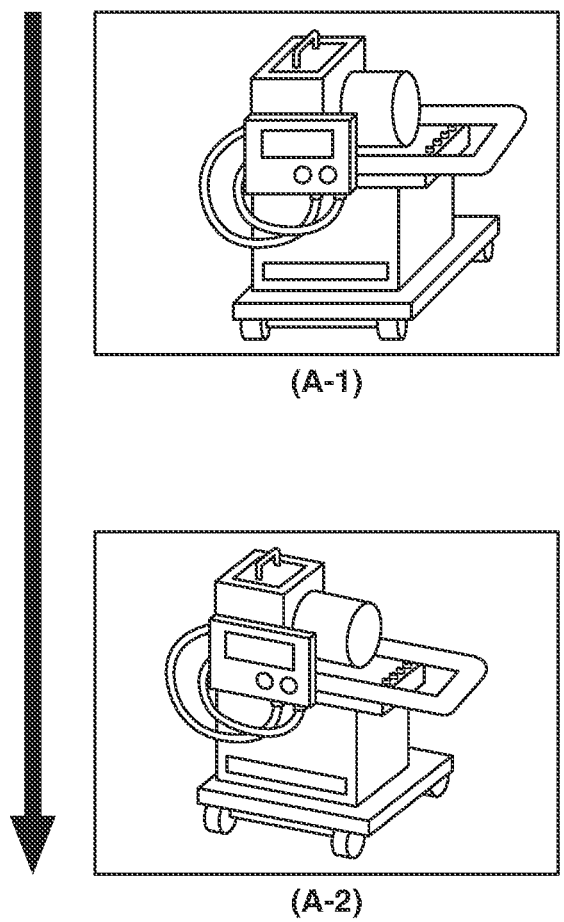
FIG. 4A is a diagram illustrating time-series changes of a camera image according to a second exemplary embodiment.

FIG. 4A illustrates time-series changes of the camera image, and frames (A-1) and (A-2) of the camera image are arranged in a time-series order. In the present exemplary embodiment, the operator wearing the HMD moves, and a viewing angle of the HMD camera unit 101 is accordingly changed. In this case, the image of the region of interest obtained by simply extracting the region of interest from the camera image, enlarging the image of the region of interest, and displaying the enlarged image on the display unit 112 may be hard to be seen.

In the present exemplary embodiment, the display control unit 116 extracts the region of interest from the camera image received by the reception unit 111, based on the region of interest mapped by the region-of-interest arrangement unit 115, performs affine transformation to maintain the same angle of view based on the region-of-interest information stored by the region-of-interest designation unit 114, and then enlarges the image of the region of interest and displays the enlarged image on the display unit 112.

A display example of the display unit 112 is described with reference to FIG. 4A to FIG. 4C.

FIG. 4A illustrates time-series changes of the camera image, and the frames (A-1) and (A-2) of the camera image are arranged in a time-series order. In the present exemplary embodiment, the operator wearing the HMD moves, and the viewing angle of the HMD camera unit 101 is accordingly changed.

Figure 4B:
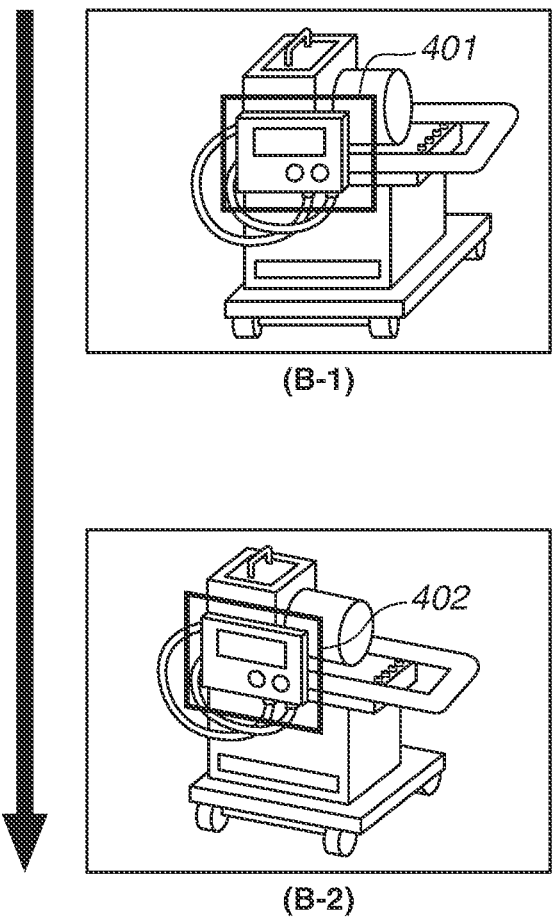
FIG. 4B is a diagram illustrating time-series changes of a region of interest according to the second exemplary embodiment.

FIG. 4B includes diagrams schematically illustrating frames (B-1) and (B-2) in which regions of interest 401 and 402 are mapped in the frames (A-1) and (A-2) in FIG. 4A, respectively, by the region-of-interest arrangement unit 115.

Figure 4C:
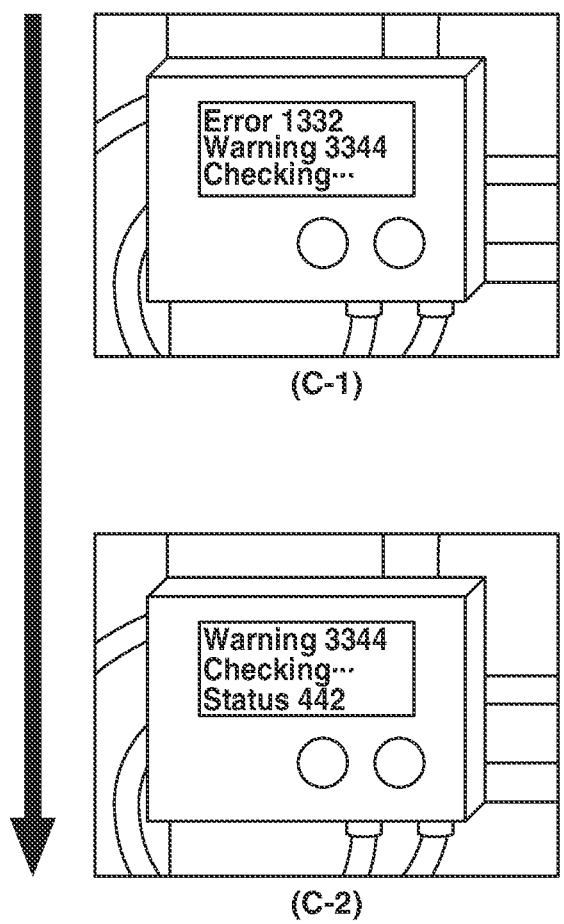
FIG. 4C is a diagram illustrating time-series changes of a display unit of a remote support apparatus according to the second exemplary embodiment.

A diagram in FIG. 4C illustrates a frame (C-1) in which the region of interest is extracted from the frame (A-1) in FIG. 4A and the image of the region of interest is enlarged and displayed. Another diagram in FIG. 4C illustrates a frame (C-2) in which the region of interest is extracted from the frame (A-2) in FIG. 4A, the affine transformation is performed, and the image of the region of interest is enlarged and displayed.

More specifically, the region of interest 401 in the frame (B-1) in FIG. 4B is a region designated in the frame (A-1) in FIG. 4A by the region-of-interest designation unit 114. The region of interest 401 is a region mapped on the three-dimensional environmental map coordinate by the region-of-interest arrangement unit 115, based on the region-of-interest information stored by the region-of-interest designation unit 114. Since the region of interest 401 is in the angle of view of the frame of the camera image, the image of the region of interest 401 is enlarged and displayed as a live-view image on the display unit 112 as illustrated in the frame (C-1) in FIG. 4C.

Figure 4D:
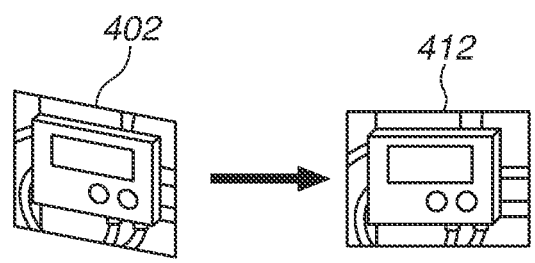
FIG. 4D is a diagram illustrating images before and after affine transformation according to the second exemplary embodiment.

The region of interest 402 in the frame (B-2) in FIG. 4B is a region mapped on the three-dimensional environmental map coordinate by the region-of-interest arrangement unit 115, based on the region-of-interest information on the region of interest designated in the frame (B-1) in FIG. 4B. The three-dimensional environmental map coordinate is calculated from the frame (A-2) in FIG. 4A of the camera image by the space recognition unit 113. In the present exemplary embodiment, as illustrated in FIG. 4D, the region of interest 402 is extracted, and the affine transformation is performed on the extracted region of interest 402 to maintain the same angle of view based on the region-of-interest information stored by the region-of-interest designation unit 114, the resultant of which is a region of interest 412 after affine transformation. Since the region of interest 402 is in the angle of view of the frame of the camera image, the image of the region of interest 412 after the affine transformation is enlarged and displayed as a live-view image on the display unit 112, as illustrated in the frame (C-2) in FIG. 4C.

Next, processing performed by the remote support apparatus 110 according to the present exemplary embodiment is described. While, the processing that is performed by the remote support apparatus 110 is basically similar to the processing in the flowchart of FIG. 3, processing of the affine transformation is added in step S306.

In step S306 according to the second exemplary embodiment, the display control unit 116 extracts the region of interest mapped in step S304 from the current frame of the camera image, performs the affine transformation to maintain the same angle of view based on the region-of-interest information on the region of interest designated by the region-of-interest designation unit 114, and then generates an image of the region of interest. Further, the display control unit 116 stores the image of the region of interest for one frame.

As described above, in the second exemplary embodiment, similar to the first exemplary embodiment, even when the region of interest is off from the angle of view of the frame of the camera image, the image of the region of interest included in the frame preceding the current frame is displayed. Therefore, the assistant can check the region of interest, and provide continuous support to the operator.

Further, in the present exemplary embodiment, even when the viewing angle of the HMD camera unit 101 is changed due to movement of the operator wearing the HMD or the like, the image of the region of interest can be maintained at the same angle of view, and thus an easily viewable image can be provided.

In a third exemplary embodiment, a description will be given of a case including a function of designating a plurality of regions of interest, and selecting and displaying a desired region of interest from among the plurality of regions of interest. The configuration of the remote support apparatus 110 is similar to the configuration of the remote support apparatus 110 according to the first exemplary embodiment. In the following description, the components are denoted by the same reference numerals, the redundant descriptions are omitted, and differences from the first exemplary embodiment are mainly described. In the present exemplary embodiment, the region-of-interest designation unit 114 additionally has a function of designating a plurality of regions of interest and storing region-of-interest information on each of the regions of interest. Further, the display control unit 116 additionally has a function of displaying images of the plurality of regions of interest in thumbnails, and largely displaying an image selected from among the images displayed in thumbnails as a main image.

In the present exemplary embodiment, the region-of-interest designation unit 114 receives designation of a plurality of regions of interest on the camera image displayed on the display unit 112, and stores the region-of-interest information on each of the regions of interest.

The display control unit 116 extracts the regions of interest from the camera image received by the reception unit 111, based on the regions of interest mapped by the region-of-interest arrangement unit 115, resizes the images of the regions of interest, and displays the resized images in thumbnails on the display unit 112. In this case, similar to the first exemplary embodiment, in a case where the regions of interest are in the angle of view of the frame of the camera image, the display control unit 116 extracts the regions of interest from the frame, resizes the images of the regions of interest, and displays the resized images in thumbnails on the display unit 112.

The display control unit 116 has a function of storing the images of the plurality of regions of interest for one frame, and updates the stored images of the regions of interest with the latest images every time the regions of interest are extracted from the frame of the camera image. Further, in a case where any of the regions of interest is off from the angle of view of the frame of the camera image, the display control unit 116 resizes the stored images of the regions of interest, more specifically, the images of the regions of interest in the frame preceding the current frame, and displays the resized images in thumbnails on the display unit 112. Then, the display control unit 116 largely displays the image selected from among the images displayed in the thumbnails as a main image.

A display example of the display unit 112 is described with reference to FIG. 5A to FIG. 5C.

Figure 5A:
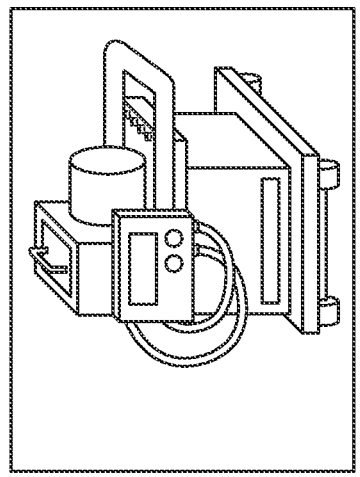
FIG. 5A is a diagram illustrating a camera image according to a third exemplary embodiment.

FIG. 5A is a diagram illustrating a frame of the camera image.

Figure 5B:
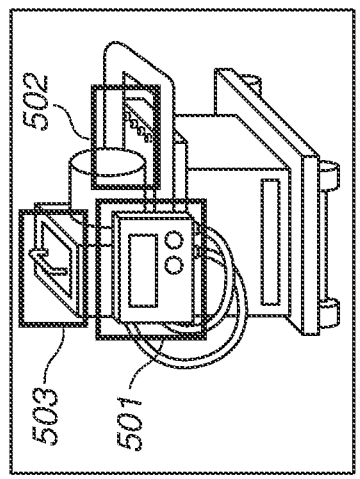
FIG. 5B is a diagram illustrating regions of interest according to the third exemplary embodiment.

FIG. 5B is a diagram schematically illustrating a state in which a plurality of regions of interest 501 to 503 are mapped in the frame of FIG. 5A by the region-of-interest arrangement unit 115.

Figure 5C:
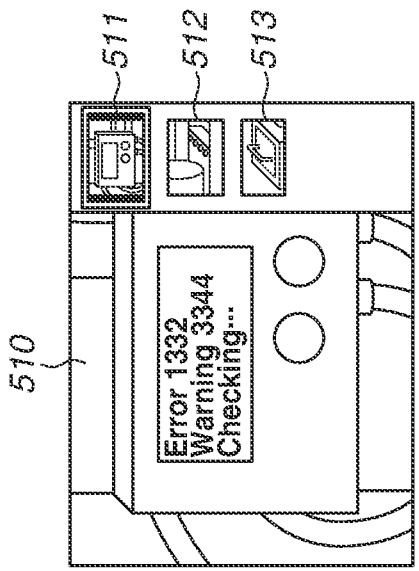
FIG. 5C is a diagram illustrating a display example of a display unit of a remote support apparatus according to the third exemplary embodiment.

FIG. 5C is a diagram illustrating a state in which the plurality of regions of interest is extracted from the frame in FIG. 5A, and images 511 to 513 of the regions of interest are displayed in thumbnails. Further, in FIG. 5C, an image selected from among the images displayed in the thumbnails, in this case, the image 511 is largely displayed as a main image 510.

Figure 6:
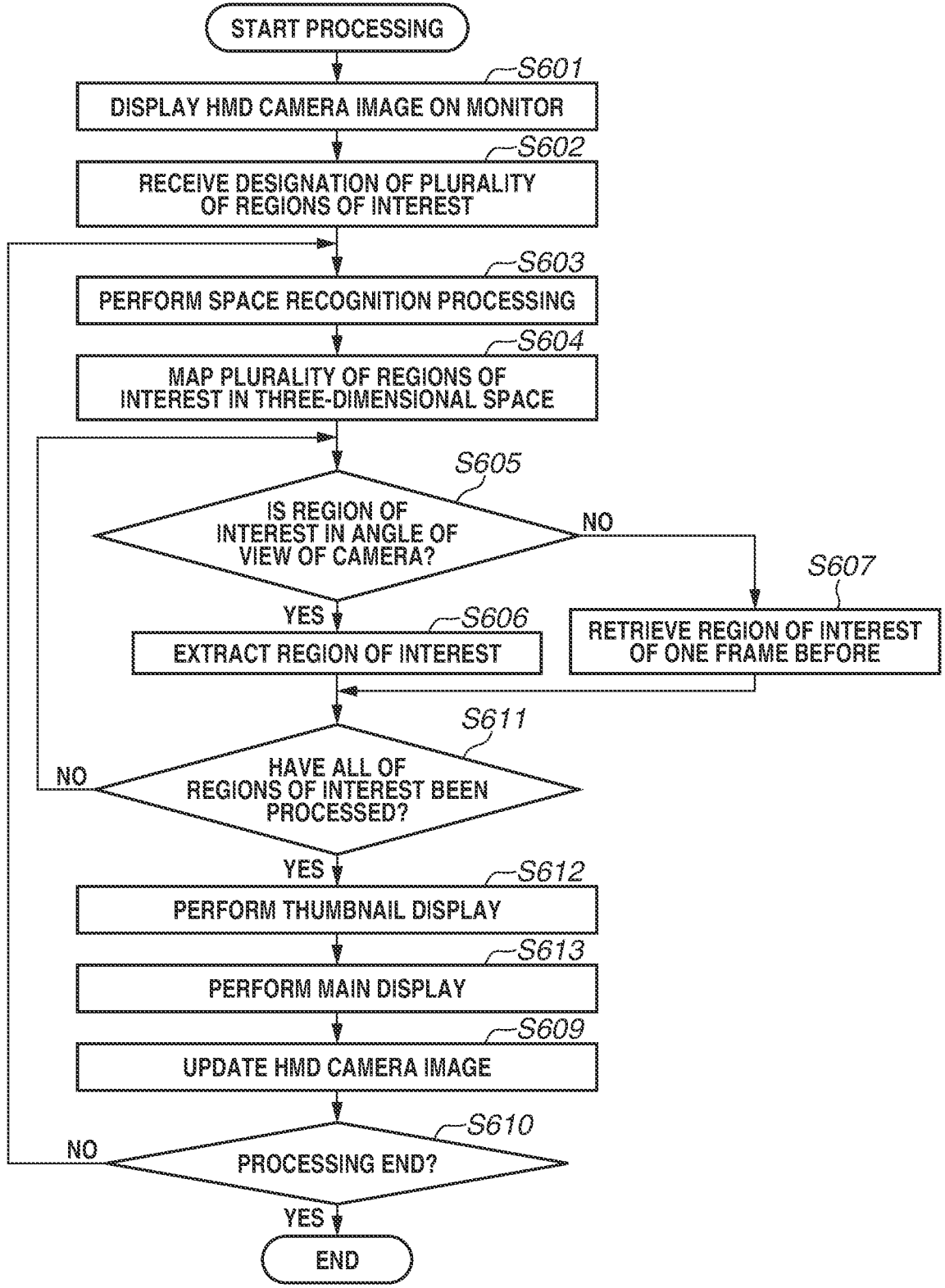
FIG. 6 is a flowchart illustrating processing that is performed by the remote support apparatus according to the third exemplary embodiment.

Next, processing performed by the remote support apparatus 110 according to the present exemplary embodiment is described with reference to FIG. 6. FIG. 6 is a flowchart illustrating the processing that is performed by the remote support apparatus 110 according to the present exemplary embodiment. Processing in steps S601, S603, S609, and S610 are similar to the processing in steps S301, S303, S309, and S310, respectively, according to the first exemplary embodiment, and the redundant descriptions of the processing are omitted.

In step S602, the region-of-interest designation unit 114 receives designation of a plurality of regions of interest on the camera image displayed on the display unit 112 in step S601, and stores coordinates of the regions of interest as a plurality of pieces of region-of-interest information.

In step S604, the region-of-interest arrangement unit 115 maps the plurality of regions of interest on the three-dimensional environmental map coordinates calculated in step S603, based on the plurality of pieces of region-of-interest information stored in step S602.

In step S605, the display control unit 116 determines whether a target region of interest among the plurality of regions of interest mapped on the three-dimensional environmental map coordinates in step S604 is in the angle of view of the current frame of the camera image. In a case where the region of interest is in the angle of view (YES in step S605), the processing proceeds to step S606. In a case where the region of interest is not in the angle of view (NO in step S605), the processing proceeds to step S607. A criterion of the determination whether the region of interest is in the angle of view of the current frame is as described in the first exemplary embodiment. In step S611 described below, the plurality of regions of interest is sequentially processed.

In step S606, the display control unit 116 extracts the region of interest mapped in step S604 from the current frame of the camera image, and generates an image of the region of interest. Further, the display control unit 116 stores the image of the region of interest for one frame.

In step S607, the display control unit 116 retrieves the stored image of the region of interest.

In step S611, the display control unit 116 determines whether all of the plurality of pieces of region-of-interest information designated in step S602 have been processed. In a case where all of the plurality of pieces of region-of-interest information have been processed (YES in step S611), the processing proceeds to step S612. In a case where all of the plurality of pieces of region-of-interest information have not been processed (NO in step S611), the processing returns to step S605.

In step S612, the display control unit 116 resizes the images of the regions of interest generated in step S606 or the images of the regions of interest retrieved in step S607, and displays the resized images in the thumbnails on the display unit 112.

In step S613, the display control unit 116 largely displays the image selected from among the images displayed in the thumbnails in step S612, as a main image (main display).

As described above, in the third exemplary embodiment, as in the first exemplary embodiment, even when the region of interest is off from the angle of view of the frame of the camera image, the image of the region of interest included in the frame preceding the current frame is displayed. Therefore, the assistant can check the region of interest, and provide continuous support to the operator.

Further, in the third exemplary embodiment, the plurality of regions of interest can be designated, and the desired region of interest can be selected and displayed. Therefore, efficiency of remote support can be improved.

Although the various kinds of exemplary embodiments are described above, functions described below may be added.

For example, information on the region of interest designated by the assistant and mapped is transmitted to the HMD, and the region of interest is indicated with a frame or the like on the HMD panel. This enables the operator to recognize the region of interest designated by the assistant.

Figure 7A:
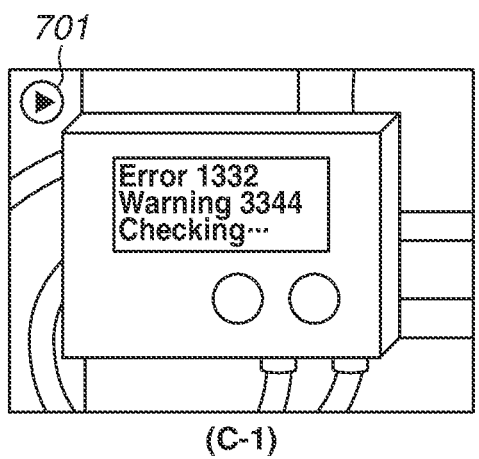
FIG. 7A is a diagram illustrating a modification of display of the display unit of the remote support apparatus according to the present exemplary embodiments.
Figure 7B:
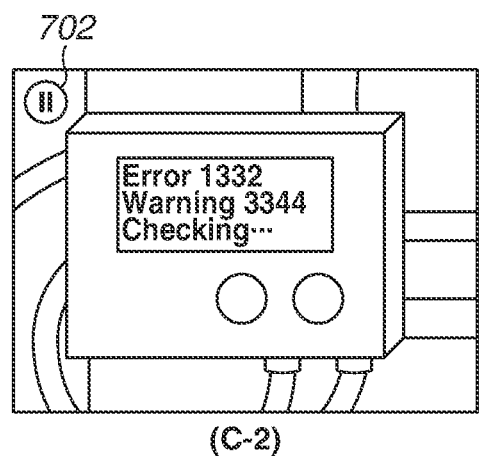
FIG. 7B is a diagram illustrating the modification of display of the display unit of the remote support apparatus according to the present exemplary embodiments.

Further, as illustrated in FIG. 7A and FIG. 7B, an indication of whether the image of the region of interest displayed on the display unit 112 is the image of the region of interest being in the angle of view or the image of the region of interest which is currently out from the angle of view can be provided. The diagrams illustrated in FIGS. 7A and 7B includes a frame (C-1) and a frame (C-2), respectively, in each of which the image of the region of interest is enlarged and displayed. In the frame (C-1) in FIG. 7A, a mark 701 indicating that the displayed image is an image of the region of interest being in the angle of view (live-view image) is displayed. In the frame (C-2) in FIG. 7B, a mark 702 indicating that the displayed image is an image of the region of interest which is currently out from the angle of view (still image) is displayed.

Although the present disclosure is described above with the exemplary embodiments, the above-described exemplary embodiments are merely embodiment examples for implementation of the present disclosure, and the technical scope of the present disclosure should not be construed thereby in a limited manner. In other words, the present disclosure can be implemented in various forms without departing from the technical idea or the main features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-064560, filed Apr. 8, 2022, which is hereby incorporated by reference herein in its entirety.

What is claimed is:

1. An information processing apparatus that displays a captured image captured by an imaging apparatus on a display unit, the information processing apparatus comprising:
a display controller configured to perform display control to display an image of a region of interest included in the captured image, on the display unit,
wherein, the display controller displays, in a case where the region of interest is in an angle of view of a frame of the captured image, an enlarged live-view image of the region of interest from the image of the region of interest included in the frame, and displays, in a case where the region of interest is cut-off from the angle of view of the frame of the captured image, an enlarged still-image of the region of interest from the image of the region of interest included in a preceding frame, wherein the preceding frame includes the region of interest in the angle of view of the frame of the captured image.

2. The information processing apparatus according to claim 1, further comprising:

a processor and a memory which function as:
a space recognition unit configured to recognize a space from the captured image; and
a region-of-interest arrangement unit configured to map the region of interest in the space recognized by the space recognition unit.

3. The information processing apparatus according to claim 1, wherein the processor and the memory further function as a region-of-interest designation unit configured to designate the region of interest based on the captured image.

4. The information processing apparatus according to claim 1, wherein the processor and the memory further function as an image processing unit configured to perform geometric transformation on the image of the region of interest.

5. The information processing apparatus according to claim 1,
wherein the region of interest includes a plurality of regions of interest, and
wherein the display controller displays images of the plurality of regions of interest in thumbnails, and largely displays an image selected from among the images displayed in the thumbnails.

6. The information processing apparatus according to claim 1, wherein the display controller indicates whether the image of the region of interest is an image of the region of interest being in the angle of view or an image of the region of interest which is cut-off from the angle of view.

7. The information processing apparatus according to claim 1, wherein the imaging apparatus is a digital camera mounted on a head mount display.

8. An information processing method that is performed by an information processing apparatus configured to display a captured image captured by an imaging apparatus on a display unit, the information processing method comprising:
performing display control to display an image of a region of interest included in the captured image on the display unit,
wherein, in the display control, in a case where the region of interest is in an angle of view of a frame of the captured image, an enlarged live-view image of the region of interest from the image of the region of interest included in the frame is displayed, and in a case where the region of interest is cut-off from the angle of view of the frame of the captured image, an enlarged still-image of the region of interest from the image of the region of interest included in a preceding frame is displayed,
wherein the preceding frame includes the region of interest in the angle of view of the frame of the captured image.

9. The information processing method according to claim 8, further comprising:
recognizing a space from the captured image; and
mapping the region of interest in the recognized space.

10. The information processing method according to claim 8, further comprising designating the region of interest based on the captured image.

11. The information processing method according to claim 8, further comprising performing geometric transformation on the image of the region of interest.

12. The information processing method according to claim 8,
wherein the region of interest includes a plurality of regions of interest, and wherein images of the plurality of regions of interest are displayed in thumbnails, and an image selected from among the images displayed in the thumbnails is largely displayed.

13. The information processing method according to claim 8, wherein, in the display control, whether the image of the region of interest is an image of the region of interest being in the angle of view or the image of the region of interest which is cut-off from the angle of view is indicated.

14. The information processing method according to claim 8, wherein the imaging apparatus is a digital camera mounted on a head mount display.

15. A non-transitory computer-readable storage medium storing a program for causing an information processing apparatus that displays a captured image captured by an imaging apparatus on a display unit, to execute an information processing method, the information processing method comprising:

performing display control to display an image of a region of interest included in the captured image on the display unit, wherein, in the display control, in a case where the region of interest is in an angle of view of a frame of the captured image, an enlarged live-view image of the region of interest from the image of the region of interest included in the frame is displayed, and in a case where the region of interest is cut-off from the angle of view of the frame of the captured image, an enlarged still-image of the region of interest from the image of the region of interest included in a preceding frame is displayed, wherein the preceding frame includes the region of interest in the angle of view of the frame of the captured image.

* * * * *